Aug. 24, 1965   R. L. SEIDENBERG   3,202,050
ZOOM TYPE OF EYEPIECE FOR OPTICAL INSTRUMENT
Filed Dec. 15, 1961

INVENTOR.
RICHARD L. SEIDENBERG
BY
ATTORNEY

United States Patent Office 3,202,050
Patented Aug. 24, 1965

3,202,050
ZOOM TYPE OF EYEPIECE FOR OPTICAL INSTRUMENT
Richard L. Seidenberg, Rochester, N.Y., assignor to Bausch & Lomb Incorporated, Rochester, N.Y., a corporation of New York
Filed Dec. 15, 1961, Ser. No. 159,514
1 Claim. (Cl. 88—57)

The present invention relates to an eyepiece for an optical instrument and more particularly it relates to a zoom type of optical system therefor.

Although zoom types of optical systems for eyepieces are to be found in several different forms in the patented art, most of such systems are complex in structure which results in comparatively expensive manufacturing cost and maintenance.

In view of the aforesaid and other difficulties, it is an object of this invention to provide a novel zoom type of optical system having a zooming range of at least 2.0 and having good optical performance, the construction thereof being simple in form and economical to manufacture and maintain in good working order and furthermore maintaining the image at a substantially constant focus.

Figure 1:
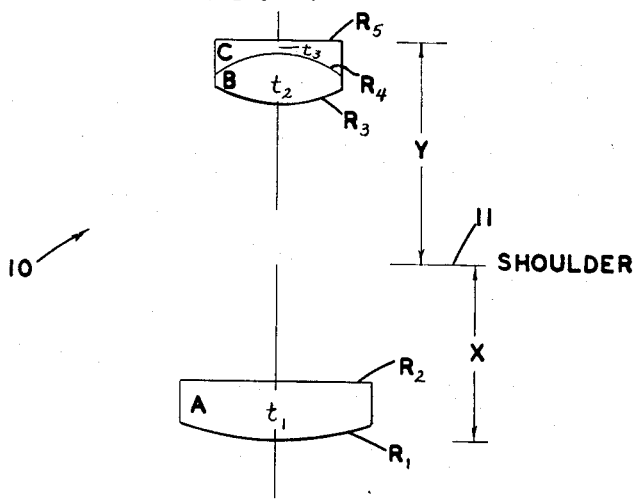
Figure 2:
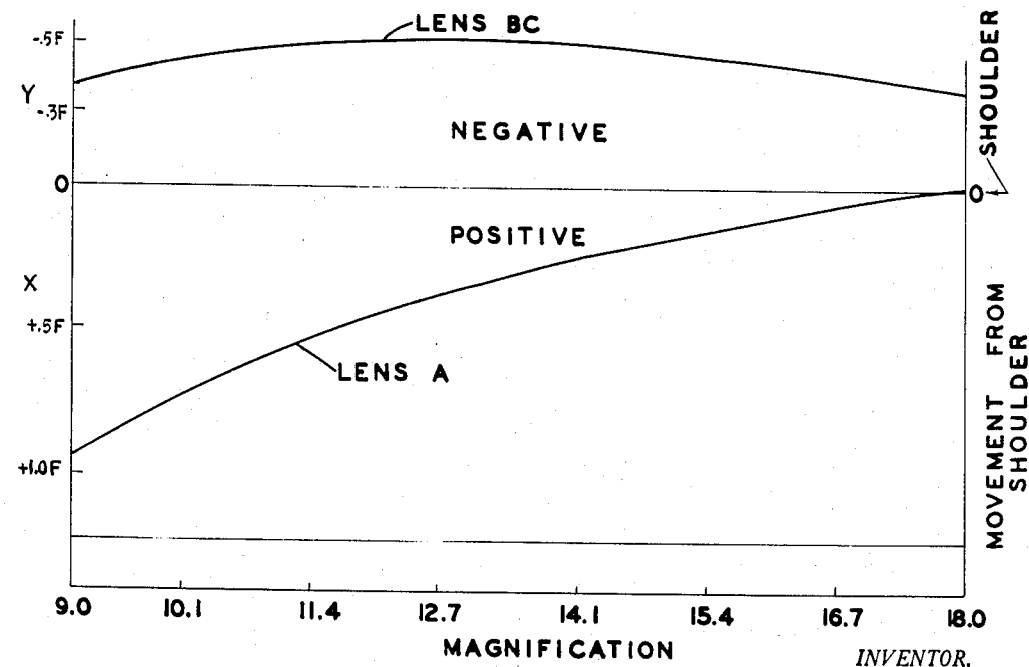

Further objects and advantages will be found in the details of construction and arrangement of parts thereof, reference being had to the specification herebelow taken together with the accompanying drawing, wherein:

FIG. 1 is an optical diagram of an optical system constructed according to the present invention; and FIG. 2 is a graph showing the zooming motion of the respective lens members.

With reference to FIG. 1 of the drawing, there is diagrammatically shown an eyepiece 10 constructed according to the present invention, said eyepiece comprising a front positive lens A and a rear positive lens BC. Preferably, the lens A is a singlet and lens BC is a doublet of achromatic form and these lenses are moved axially with differential zooming motions with respect to a fixed shoulder 11 on said eyepiece 10, as shown in FIG. 2, so as to progressively and continuously vary the magnification of the image produced by the eyepiece through a magnification range of substantially 2.0 while maintaining the position of said image at a constant focus. Considering the distance from the front apex of the lens A to shoulder 11 to be represented by X and the distance from the rear apex of the rear lens BC to said shoulder to be represented by Y, and also considering distances below the shoulder as being positive in nature, the aforesaid differential motions may be mathematically described in the following table. In said table, said motions are plotted against magnifications of the image produced by the optical system, "magnification" being defined in the usual manner as $250/f$, where $f$ represents the resulting focal length of the lens A, BC combination for the stipulated separation of the lenses, $f$ being expressed in millimeters, and the value F representing the focal length of said eyepiece 10 at a magnification of substantially 9.0.

| Magnification | X | Y |
|---|---|---|
| 9.0 | .963 F | −.362 F |
| 10.1 | .751 F | −.455 F |
| 11.4 | .550 F | −.512 F |
| 12.7 | .391 F | −.527 F |
| 14.1 | .261 F | −.513 F |
| 15.4 | .154 F | −.476 F |
| 16.7 | .064 F | −.422 F |
| 18.0 | −.0127 F | −.356 F |

The positive focal length of lens member A has a value between 1.25F and 1.52F, while the value of the positive focal length of lens member BC lies between .64F and .68F, the first focal length $F_1$ being related to the second length $F_2$ according to the equation herebelow.

$$\frac{F_1}{F_2} = 1.95 \text{ substantially}$$

The focal plane of the eyepiece 10 in accordance with the above-stated values should be stationary at a distance of between .84F and .88F forwardly of said rear apex of lens BC.

Calculation and experiment on the optical system here described has demonstrated that the values of radii $R_1$ to $R_5$ for the lens surfaces, the values of $t_1$ to $t_3$ representing the successive lens element thicknesses and the values for refractive index $n_D$ and Abbe number $\nu$ should be as specified in the table of mathematical expressions herebelow:

$$.77F < R_1 < 0.94F$$
$$R_2 > \pm F$$
$$.26F < R_3 < .32F$$
$$.21F < -R_4 < .26F$$
$$R_5 > \pm F$$
$$.11F < t_1 < .14F$$
$$.10F < t_2 < .12F$$
$$.03F < t_3 < .04F$$
$$1.615 < n_D(A) < 1.620$$
$$1.515 < n_D(B) < 1.520$$
$$1.615 < n_D(C) < 1.620$$
$$35.0 < \nu(A) < 38.0$$
$$63.0 < \nu(B) < 66.0$$
$$35.0 < \nu(C) < 38.0$$

In one successful form of this invention, the values for lens radii, lens thicknesses and the refractive index $n_D$ and Abbe number $\nu$ of the respective lens elements used in the construction are as stated in the table herebelow where F represents the focal length of the eyepiece 10 at 9.0 times magnification.

| Lens | Lens radii | Lens thicknesses | $n_B$ | $\nu$ | Focal length |
|---|---|---|---|---|---|
| A | $R_1 = .854$ F | $t_1 = .126$ F | 1.617 | 36.6 | $F_1 = 1.384$ F |
|   | $R_2 = \infty$ | | | | |
| B | $R_3 = .290$ F | $t_2 = .108$ F | 1.517 | 64.5 | $F_2 = .710$ F |
|   | $R_4 = -.234$ F | | | | |
| C | $R_5 = \infty$ | $t_3 = .036$ F | 1.617 | 36.6 | |

The zoom optical system of the eyepiece above described will be seen to require only the simpler and less costly forms of construction and in spite of this fact, a very satisfactory optical performance is achieved. Although only a preferred form of the invention is shown and described in detail, other forms are possible and changes may be made in the details thereof without departing from the spirit of the invention as defined in the claim here appended.

What is claimed is:

A zoom type of eyepiece for an optical instrument comprising
  a front singlet plano convex lens member designated A and having its plano surface rearmost, and
  a rear compound plano convex lens member optically aligned therewith and having a front double convex lens element designated B and a rear plano concave lens element designated C and having its concave surface in contact with the rear surface of element B,
  said lens members being spaced apart and being moved at different respective rates to vary the magnification of the image through a zoom range of at least 2.0 as specified in the table herebelow wherein X is the variable distance between a stationary point on the optical axis and the front apex of member A and Y is the variable distance between said point and the rear apex of said lens element C, and F denotes the focal length of said eyepiece at 9× magnification,

| MAGNIFICATION | X | Y |
|---|---|---|
| 9.0 | .963 F | −.362 F |
| 10.1 | .751 F | −.455 F |
| 11.4 | .550 F | −.512 F |
| 12.7 | .391 F | −.527 F |
| 14.1 | .261 F | −.513 F |
| 15.4 | .154 F | −.476 F |
| 16.7 | .064 F | −.422 F |
| 18.0 | −.0127 F | −.356 F | wherein the minus (−) sign represents motion on one side of said stationary point and the plus (+) sign represents motion on the other side thereof, the constructional data for said eyepiece being given in the table herebelow, wherein $R_1$ to $R_5$ represent the radii of the successive lens surfaces numbering from the front of member A, the minus (−) sign used with the $-R_4$ value meaning that its center of curvature lies on the entrant side of the vertex of that surface, $t_1$ to $t_3$ represent the axial thickness of the lens elements, and $n_D$ and $\nu$ represent respectively the refractive index and the Abbe number of the successive lens materials,

| Lens | Radii | Thicknesses | $n_D$ | $\nu$ |
|---|---|---|---|---|
| A | $R_1 = .854\ F$<br>$R_2 = \infty$ | $t_1 = .126\ F$ | 1.615 to 1.620 | 35.0 to 38.0 |
| B | $R_3 = .290\ F$<br>$R_4 = -.234\ F$ | $t_2 = .108\ F$ | 1.515 to 1.520 | 63.0 to 66.0 |
| C | $R_5 = \infty$ | $t_3 = .036\ F$ | 1.615 to 1.620 | 35.0 to 38.0 |

References Cited by the Examiner

UNITED STATES PATENTS 1,479,251   1/24   Repp ------------------ 88—57

FOREIGN PATENTS 200,685   7/23   Great Britain.
877,934   9/61   Great Britain.

JEWELL H. PEDERSEN, *Primary Examiner.*